United States Patent [19]
Holling et al.

[11] Patent Number: 5,990,643
[45] Date of Patent: Nov. 23, 1999

[54] SENSORLESS COMMUTATION POSITION DETECTION FOR BRUSHLESS D.C. MOTORS

[75] Inventors: George H. Holling, Sun Prairie; Mark Yeck; Michael Schmitt, both of Ripon, all of Wis.

[73] Assignee: Advanced Motion Controls, Inc., Sun Prairie, Wis.

[21] Appl. No.: 09/122,026

[22] Filed: Jul. 24, 1998

[51] Int. Cl.$^6$ .................................. H02P 6/14; H02P 5/28
[52] U.S. Cl. ........................ 318/254; 318/138; 318/439
[58] Field of Search ..................... 318/138, 139, 318/245, 254, 439, 101, 590, 591, 611, 127, 719, 811; 388/809; 360/73.3, 75

[56] References Cited

U.S. PATENT DOCUMENTS

| | | | |
|---|---|---|---|
| 5,017,845 | 5/1991 | Carobolante et al. | 318/138 |
| 5,191,270 | 3/1993 | McCormack | 318/254 |
| 5,327,053 | 7/1994 | Mann et al. | 318/254 |
| 5,350,988 | 9/1994 | Le | 318/618 |
| 5,451,832 | 9/1995 | Cameron et al. | 318/375 |
| 5,473,725 | 12/1995 | Chen et al. | 318/254 |
| 5,510,687 | 4/1996 | Ursworth et al. | 318/727 |
| 5,600,218 | 2/1997 | Holling et al. | 318/439 |
| 5,619,109 | 4/1997 | Cameron et al. | 318/375 |
| 5,631,999 | 5/1997 | Dinsmore | 388/805 |
| 5,650,886 | 7/1997 | Codilian et al. | 360/73.03 |
| 5,723,963 | 3/1998 | Li et al. | 318/590 |
| 5,767,643 | 6/1998 | Pham et al. | 318/439 |
| 5,767,654 | 6/1998 | Menegoli et al. | 318/811 |
| 5,789,895 | 8/1998 | Lee | 318/811 |
| 5,821,713 | 10/1998 | Holling et al. | 318/138 |
| 5,859,520 | 1/1999 | Bourgeois et al. | 318/805 |
| 5,909,095 | 6/1999 | Sakti et al. | 318/254 |

*Primary Examiner*—Paul Ip
*Attorney, Agent, or Firm*—Haugen Law Firm PLLP

[57] ABSTRACT

A rotor position determination system for a polyphase D.C. brushless motor utilizing the back electromotive force (B.E.M.F.) voltage of the open or "off" phase of the motor as a critical signal for controlling the commutation of the motor, the system further including means for phase advance of the energization of the motor.

8 Claims, 3 Drawing Sheets

SENSORLESS COMMUTATION POSITION DETECTION FOR BRUSHLESS D.C. MOTORS

BACKGROUND OF THE INVENTION

I. Field of the Invention

The present invention relates generally to the field of detecting the commutation position of a rotor within a polyphase brushless D.C. motor. More particularly, the present invention is directed to an apparatus and method capable of providing real-time commutation position detection by utilizing the back electromotive force (B.E.M.F.) voltage of the open or off phase of the motor to determine the position of the rotor.

II. Discussion of the Related Art

Generally speaking, brushless D.C. motors include a rotor and a stator having a plurality of wound field coils. Brushless motors have gained increasing popularity and enjoy a wide array of industrial applications due, in large part, to the fact that brushless motors are electronically commutated, wherein solid-state switching replaces the brushes and segmented commutators of traditional permanent magnet DC motors. The elimination of brushes simplifies motor maintenance, as there are no brushes to be serviced or replaced. Furthermore, noise reduction is effectuated because, without brushes, there is no arcing to create electromagnetic interference. The elimination of arcing also minimizes any explosion hazard in the presence of flammable or explosive mixtures. Thus, brushless motors are ideal for use in any setting where sensitive circuitry or hazardous conditions exist or are present.

Brushless motors may be of the variable reluctance, permanent magnet, or hybrid type. Variable reluctance brushless motors are characterized by having an iron core rotor follow or "chase" sequentially shifting magnetic fields of the stator coils to facilitate rotational motion of the rotor. Permanent magnet brushless motors are characterized by having the sequentially energized field coils attract or repel a permanent magnet rotor into rotational motion. Hybrid brushless motors, such as stepper motors, are operated by a train of pulses so that their rotors move or are indexed over a carefully controlled fraction of a revolution each time they receive an input step pulse. This permits rotor movement to be controlled with high precision which can be translated into precise rotational or linear movement.

To ensure proper rotational and linear movement in variable reluctance and permanent magnet brushless motors, it is essential to determine the position of the rotor with respect to the energized, or active, stator coils. By knowing this position, referred to as commutation position, the stator coils can be energized in the appropriate sequence to create a revolving magnetic field in the motor to exert the desired rotational or linear torque on the rotor. Traditionally, commutation position is detected by employing one or more transducers within the particular brushless motor to sense the position of the rotor relative to the active stator coil or coils.

However, the use of such transducers to determine commutation position has several drawbacks. First, these sensors increase production costs due to the need for sophisticated positional adjustment and increased wiring. Moreover, the space required for commutation position sensors is also a significant disadvantage in that valuable space is consumed within the motor housing. With an ever-increasing premium on space and cost efficiency, several attempts have been made to create "sensorless" commutation position feedback systems to replace the need for commutation position sensors within brushless motors.

U.S. Pat. No. 5,600,218 to Holling, et al. determines the commutation position of a rotor within a polyphase brushless motor by continuously differentiating the electric current flowing within the active stator coils.

A continuation-in-part application for said U.S. Pat. No. 5,600,218, i.e., Ser. No. 08/794,608, filed Feb. 3, 1997, teaches the detection of the position of a rotor within a polyphase brushless motor based on the rate of change (dI/dT) of the current flowing within the active and/or non-active stator coils.

U.S. Pat. No. 5,327,053 to Mann, et al. employs one such "sensorless" technique wherein the back-EMF voltage in an unenergized stator coil is employed to determine commutation position during motor start-up. However, this technique is directed to an apparatus which is very different from our invention; it requires, in part, means for detecting during start-up a qualified range of the B.E.M.F. signal in an off-winding of the motor so as to determine a suitable rotor position for start-up, the suitable position being determinable from slope and polarity data derived over the qualified range. A significant disadvantage exists with this technique in that back-EMF voltage is difficult to reliably measure during the low rotational velocity of the rotor during start up operations.

U.S. Pat. No. 5,191,270 issued to McCormack represents an attempt to overcome the disadvantages of the back-EMF method. In this technique, "sensorless" commutation detection is performed during the start up phase of operation. An initial measurement is made of the current rise time within each stator coil by applying a known voltage to each stator coil while the rotor is held stationary. A driving current is then supplied to the stator coil which is most nearly aligned with the magnetic field of the rotor so as to move the rotor slightly. A second current rise time measurement is conducted in similar fashion and compared to the initial current rise time measurement. Measurements of initial and second current rise times are analyzed for each stator coil to indicate which stator coil should be energized first to provide proper rotational direction of the rotor at start-up.

A major disadvantage exists, however, in that this method is limited solely to start-up operations. In particular, this method is aimed at determining the rotational direction of a computer disk drive during start-up so as to avoid damaging disk contents from improper rotational direction. To accomplish this, the current rise time within each stator coil is measured at two discrete intervals merely to determine which of the stator field coils should be initially energized to start the rotor in the correct rotational direction. This method, however. does not account for the commutation position of the rotor with respect to the stator field coils continuously throughout the normal, full speed operation of the motor.

Furthermore, this method does not provide an accurate assessment of commutation position. As mentioned above, this method merely measures the current rise times in all stator coils at two discrete points in time, compares these values, and initiates rotation accordingly. By basing the commutation position detection on two discrete measurements, this method must assume certain positional characteristics that cannot be assessed during the interim between current rise time measurements. These assumptions cause this method to be accurate only within one commutation, as opposed to the entire operational cycle. This can be a significant hindrance to proper motor operation because the stator coils cannot be continuously driven in an efficient fashion without an accurate and continuous determination of commutation position.

A further disadvantage of this method is that the determination of commutation position is based upon the absolute value of the current flowing within the motor. By measuring the current rise times within each stator coil at fixed time intervals, this method is highly susceptible to variations or fluctuations in motor speed, motor load, PWM frequency, and bus voltage. For example, an increase in the motor load will require the pulse width of the driving signal to be lengthened to increase the energy supplied to the motor to compensate for the increased load. Such variations in pulse width cause the current rise time measurement to vary in amplitude depending on the load experienced, thereby adversely affecting the accuracy and reliability of the commutation position detection.

Still another drawback of this method is that it requires a substantial amount of processing time to determine commutation position. This results from the need to measure current rise time twice for each stator coil, as well as the subsequent comparisons of the current rise time measurements for each stator coil. For example, a four phase brushless motor employing this method requires eight current rise time measurements, one for each stator coil prior to moving the rotor and one for each stator coil after the rotor has been moved. Each pair of current rise time measurements must then be compared to indicate the relative change in current rise time within each stator coil. Finally, the relative change of current rise time within each stator coil must be compared to indicate which stator coil is positioned closest to the rotor so that the particular stator coil can be commutated to drive the rotor into rotation.

What is needed, therefore, is a commutation position detection system which is capable of accurately and continuously assessing commutation position throughout the entire commutation process, rather than merely at start-up. A need also exists for a commutation position detection system that is not dependent on the absolute value of the current flowing within the motor. Still another need exists for a commutation position detection system that is fast and requires minimal processing time.

OBJECTS AND SUMMARY OF THE INVENTION

Accordingly, it is a primary object of the invention to provide an improved, cost effective and efficient motor control method and apparatus which includes "sensorless" commutation position detection which is capable of reliable, accurate, and continuous commutation position detection throughout all operational conditions of the motor.

Another object of the invention is to provide an improved method and apparatus for "sensorless" commutation position detection which operates independent of the current flowing within the motor to reliably and accurately determine commutation position regardless of variations in motor speed and load, PWM frequency, and/or bus voltage.

Yet another object of the present invention is to provide an improved method and apparatus for "sensorless" commutation position detection having minimal data processing time requirements for quickly determining commutation position.

Thus, in accordance with a broad aspect of the present invention, a method and apparatus are described for determining the commutation position of a polyphase brushless motor having a plurality of field coils disposed about a rotor, wherein the field coils have at least one active field coil for receiving a driving signal to generate a magnetic field that exerts the maximum amount of torque on the rotor. The first step in accomplishing such commutation position detection is to locate or determine the open or off phase of the motor. The back electromotive force (B.E.M.F.) of the open or off phase is applied via a selected branch of a multiplexer to a comparator means, the digital output of which controls the outputs (2) of a digital logic commutator means. More specifically, our invention provides a unique commutation position determination system through the provision of a closed loop control system comprising (i) an off-phase selection means or multiplexer means, (ii) a comparator means, (iii) a dual function commutator means and (iv) controllable switching means for selectively applying a D.C. bus voltage to the motor windings, the latter also being connected to the multiplexer means. The commutator means' first function is to compute "select" signals for the control of the multiplexer so that only the "off" motor winding phase voltage (B.E.M.F.) is connected as an A.C. or analog input to the comparator means. The comparator means has, in a basic embodiment of the invention applied thereto a preselected level of D.C. voltage and functions to produce at a pair of outputs thereof, digital signals, the timing of which is determined by the relationship, i.e., relative magnitudes, of the applied analog and D.C. signals. The digital signals of the comparator means are applied to and are the control signals for the commutator means which is a digital logic circuit means having, in addition to the above-described first function of multiplexer control, a second function of selectively controlling the aforesaid controllable switching means to selectively energize the motor windings from the D.C. bus. Thus the polyphase windings are energized on a selected basis that provides maximum efficiency, the "selection and utilization" of the "off" phase winding B.E.M.F. being the critical factor.

The aforesaid basic embodiment of this invention has a D.C. voltage applied to the comparator which is 50 percent of the motor D.C. bus voltage and the pair of digital output signals are spikes or pulses. However, in practice it is desirable, so as to achieve greater efficiency, to have phase advance, i.e., to advance the commutation of the voltages applied to the motor windings. This invention, therefore, captures the advantage of the aforesaid basic embodiment and supplements it with a means of providing any desired phase advance. More specifically, the preferred operational embodiment of the invention has a pair of comparators, each having a first input connected to receive the analog multiplexer output. The two comparators each also have a second input connected to receive preselected D.C. voltages, the first being $V_1=50\%+X$ and the second being $V_2=50\%-X$ where "50%" is 50 percent of the motor D.C. bus voltage and where "X" is selected in accordance with the desired amount of phase advance. It will be understood that if "X" equals zero, then we have our basic concept derived from the above-described sensorless detection of rotor position. Then, to obtain the further benefit of improved efficiency, phase advance is easily provided by our invention.

A key advantage of the invention is a fixed reference level that can be filtered and is not corrupted by switching noise or other secondary effects. Another advantage is that if the supply voltage fluctuates, there is no fluctuation of the commutation point.

The invention can be used in a "hard chopping" mode as described above where $V_1$ includes 50% of the motor D.C. bus voltage and also in a "soft chopping" mode as hereinafter described.

BRIEF DESCRIPTION OF THE DRAWINGS

In the drawings, wherein like numerals are utilized to designate like parts throughout the same.

DETAILED DESCRIPTION OF THE PREFERRED EMBODIMENT

Figure 1:
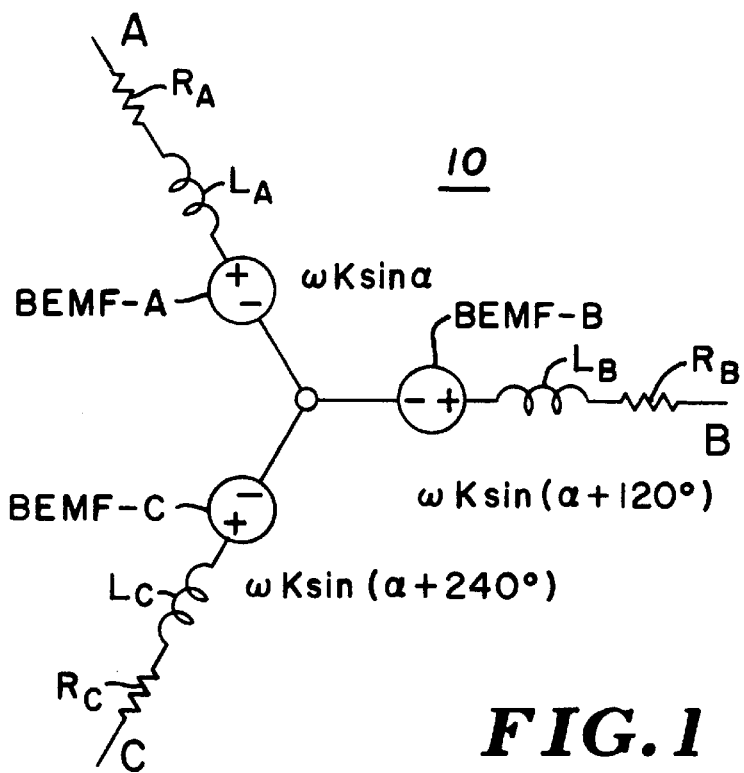
FIG. 1 is a schematic equivalent circuit diagram of a polyphase D.C. brushless motor depicted as a three phase/winding motor having a rotor (not shown)

Referring to FIG. 1, a polyphase D.C. brushless motor 10 is shown schematically. The motor 10 is shown as a three-phase machine. It should be understood, however, the subject invention may be used with all polyphase D.C. brushless motors having three or more phases.

The motor 10 has three windings, A, B and C, all joined at a neutral G. Winding AG is shown to comprise an inductor component LA, a resistive component RA (the resistance in the inductor/winding) and a BEMF voltage which is designated as BEMF-A and which may be expressed as WK sin X where W is the motor speed, K is a BEMF constant, and X is the rotor angular position relative to the stator.

Figure 2:
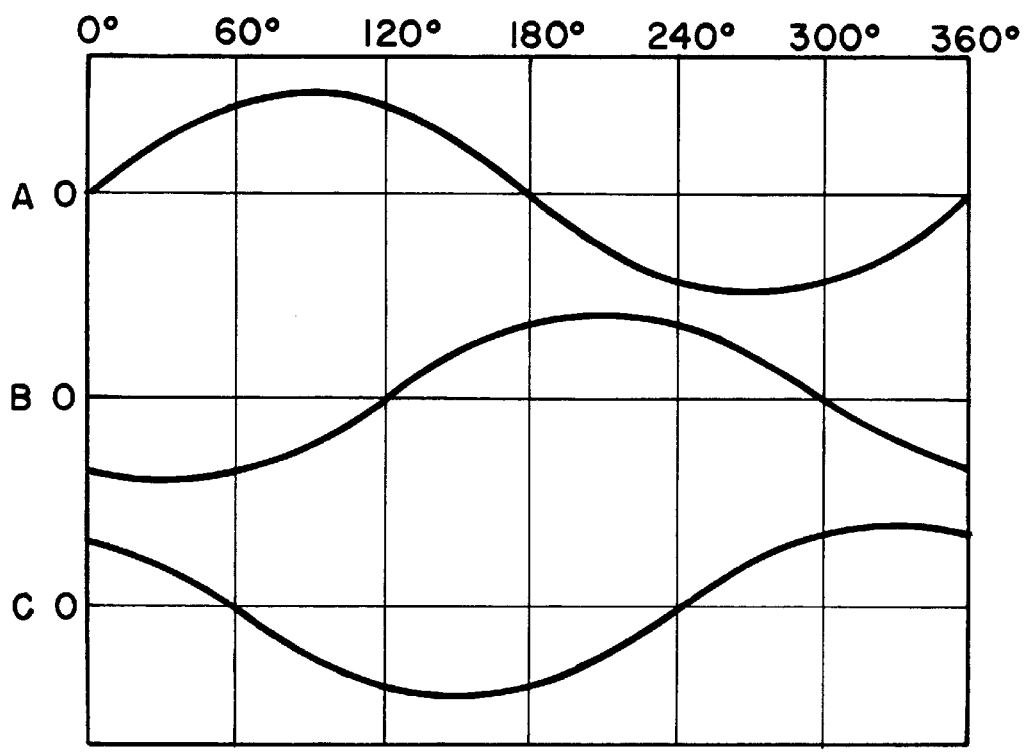
FIG. 2 is a diagram of the B.E.M.F. voltages for the three phases of the motor of FIG. 1.

The B.E.M.F. theoretical voltages for windings A, B, and C are shown in FIG. 2, a timing chart representation showing six 60° segments for each 360° rotation of the rotor. For example, BEMF-A during the first segment is ascending from zero; BEMF-C is descending from its maximum positive value; and BEMF-B is descending towards its maximum negative value. It will be seen from FIG. 2 that the B.E.M.F. voltages are sinusoidal. BEMF-A is shown going positive at 0°/360° and going negative at 180°. BEMF-B goes positive at 120° and negative at 300°. Finally, BEMF-C goes positive at 240° and negative at 60°.

Figure 3:
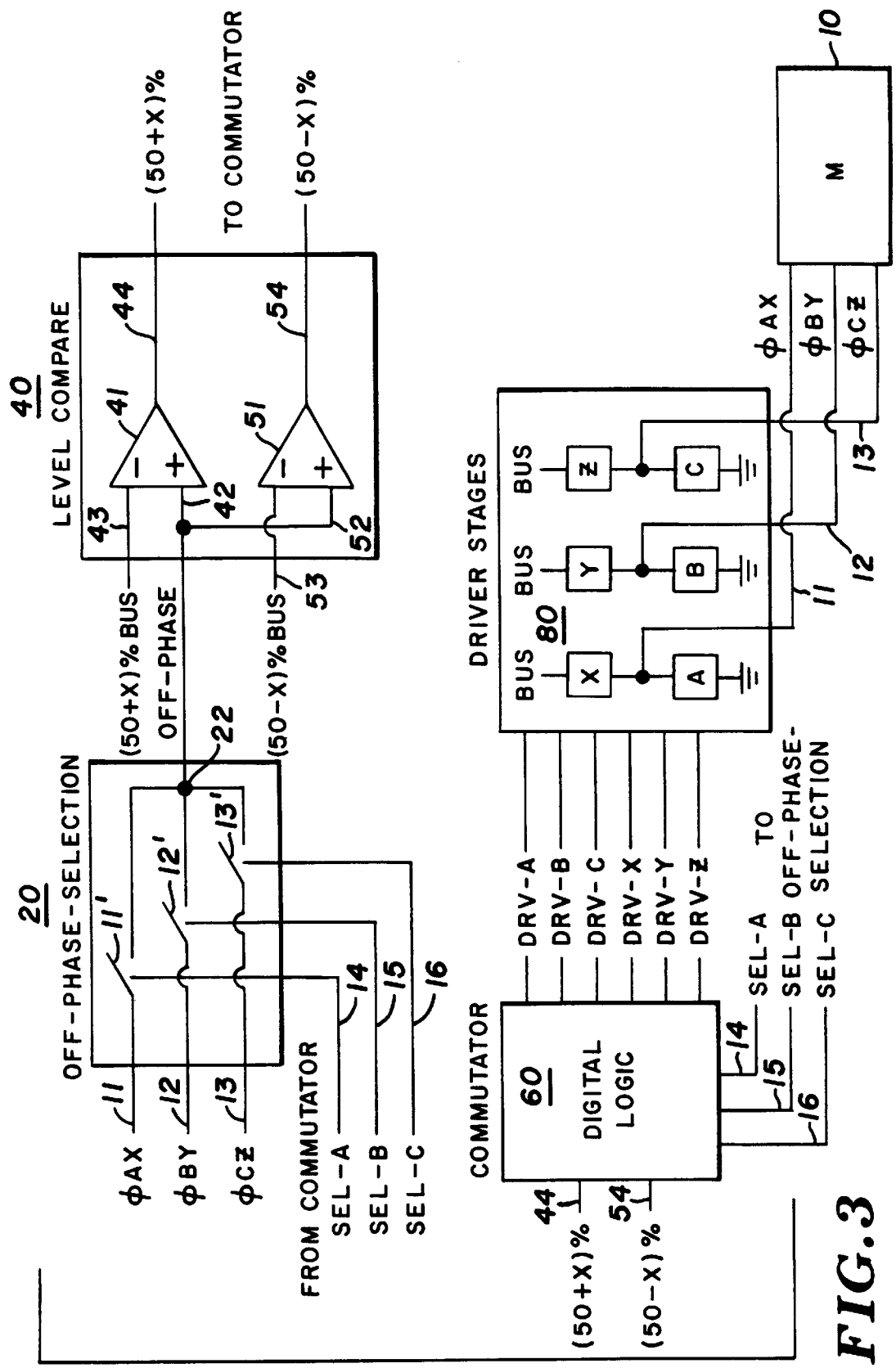
FIG. 3 is a schematic diagram of a control system for the motor of FIG. 1 and utilizing the preferred embodiment of our invention.

FIG. 3 shows the system diagram of our invention for controlling the motor 10. The major blocks or portions of the control system are an off-phase or open winding selection means or multiplexer means 20; a level compare means or comparator means 40; a dual-function commutator means 60; and a plurality of driver stages collectively identified by reference numeral 80, this latter means constituting a controllable switching means for selectively applying either a D.C. bus voltage or ground to the ends of the motor windings. The motor leads ØAX, ØBY, and ØCZ are identified in FIG. 3 respectively by reference numerals 11, 12 and 13; these same three leads are shown in the upper left hand corner of FIG. 3 as input leads for the off-phase selection means or multiplexer means 20 which is shown to have three normally open switches 11', 12' and 13', connected respectively to leads 11, 12 and 13. The load side of switches 11', 12' and 13' are shown connected together to form an output 22 of the multiplexer 20. The switches 11', 12' and 13' are controlled by the first of two outputs from the commutator means 60, more specifically three control signals identified as Select A, Select B and Select C, identified more specifically in FIG. 3 by reference numerals 14, 15 and 16, respectively. As will be described in more detail below, only one of the select signals is "on" or operative for one segment of rotor rotation. The function of the select signals is to control the switching of the switches 11', 12' and 13'. It will be understood that as shown in FIG. 3, the select signals will function to cause the switches 11', 12' and 13' to close selectively. The multiplexer 20 uses solid state technology well known by those skilled in the art. A typical unit which may be used for this function is the Siliconix Company Model No. DG211.

Figure 4:
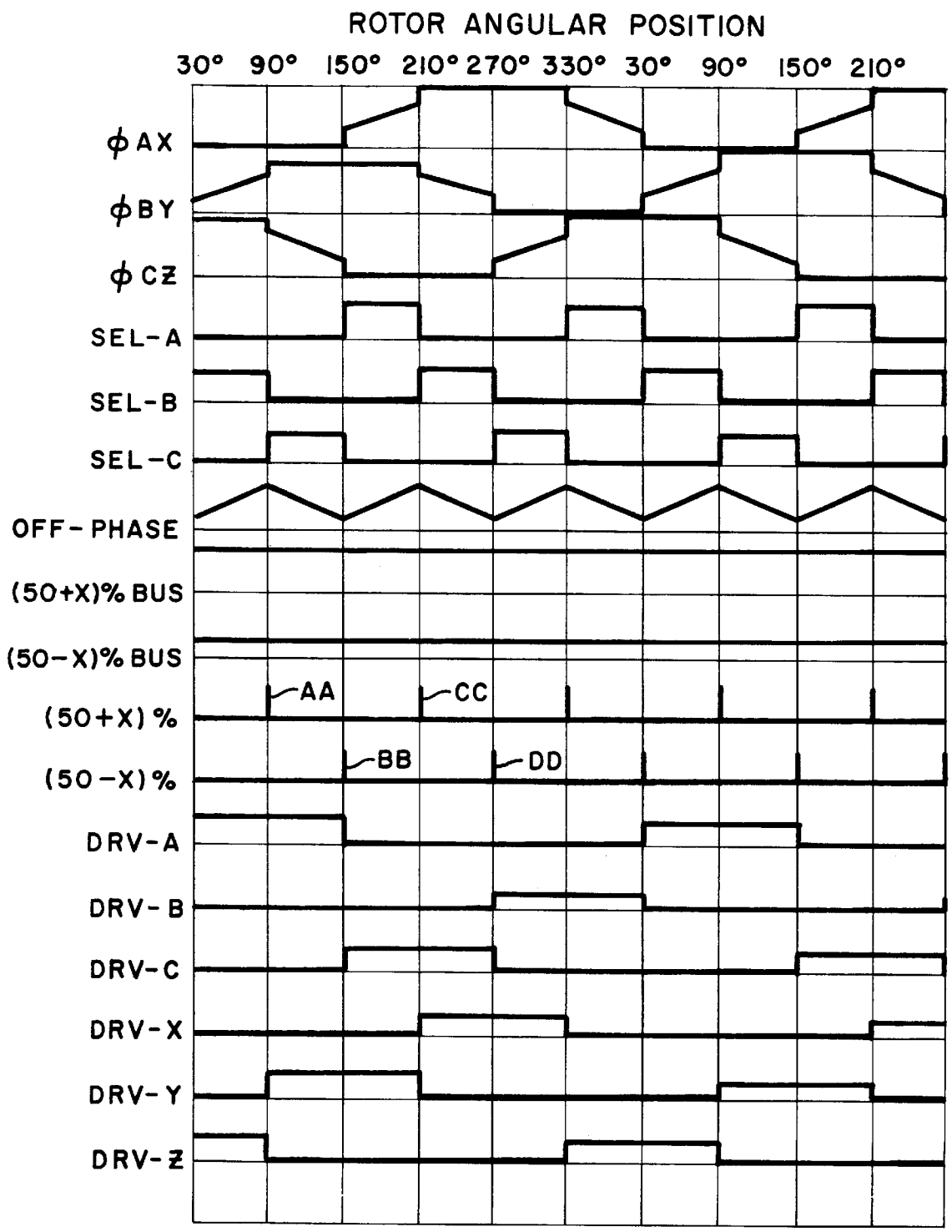
FIG. 4 is a timing chart for the control system depicted in FIG. 3.

The output from the multiplexer will be the B.E.M.F. signal of the off-phase of the motor for that particular segment of operation. Referring to FIG. 4, it is seen that for the first segment (from 0° to 60°), ØBY is the off-phase; thus a Select-B signal from commutator 60 would be present on lead 15 to close switch 12', thus applying the ØBY voltage shown in the first segment of FIG. 4 to be applied at the output 22 of multiplexer 20. The functioning of commutator 60 to produce the aforesaid Select-B signal on lead 15 will be explained below.

The output 22 of the multiplexer is applied as one of the inputs to a pair of comparators 41 and 51 in the comparator means 40; these comparators are solid state units well known to those skilled in the art. A typical unit is the National Semiconductor Model LM339. Comparators 41 and 51 each have a first input 42 and 43 respectively connected to receive the output 22 from the multiplexer 20. In addition, comparator 41 has a second input connected to a (50+X)% bus 43, and comparator 51 has another input connected to a (50−X)% bus 53. Comparators 41 and 51 have outputs 44 and 54 respectively. The comparator 40 functions as follows. If the off-phase B.E.M.F. voltage present at output 22 is a rising voltage as is depicted for ØBY for the first segment, then when the off-phase signal exceeds the value of the (50+X)% bus a digital pulse is produced at the output 44 of comparator 41. If the off-phase B.E.M.F. voltage is a descending voltage such as shown for ØCZ for the second segment (between 60° and 120°) then comparator 51 functions when the off-phase signal voltage falls below the (50−X)% bus voltage; at that point a digital pulse is produced and appears on output 54 of comparator 51.

It will be seen from FIG. 3 that the outputs 44 and 54 of the commutator 40 are applied as inputs to the digital logic commutator means 60.

Thus, if a rising off-phase B.E.M.F. exceeds the (50+X)% bus on comparator 41, the digital pulse produced at output 44 thereof as applied to the digital logic commutator 60 will cause the digital logic to commutate into the next 60° segment which generates a new select signal and new driver signals. In the same manner, if a decreasing off-phase B.E.M.F. signal is present, then as the signal falls below the (50−X)% bus level, then the resultant digital pulse on output 54 as applied to the digital logic commutator means 60 will cause the output to commutate into the next segment.

The driver stages controllable switching means 80 is shown to have switching means A, B, C, X, Y, and Z. The switches X, Y and Z are all connected to the bus voltage, a typical voltage being 170 volts D.C. The A, B and C switches are shown connected at one side to ground. Driver stages A and X are connected to lead 11; driver stages B and Y are connected to lead 12, and driver stages C and Z are connected to lead 13.

The commutator means 60 is shown to have another group of outputs identified in FIG. 3 as DRV-A, DRV-B, DRV-C, DRV-X, DRV-Y, and DRV-Z. It will be understood that the driver outputs from the commutator means are connected to control the corresponding switch or switching means in the driver stages switching means 80. For example, the outputs DRV-A and DRV-X from the commutator means 60 are connected to switches A and X respectively in unit 80. It should be understood that (i) DRV-A and DRV-X are enabled or actuated alternately so that lead 11 connected to ØAX of motor 10 is either connect (via driver stage X of the switching means 80) to the bus D.C. voltage or (via driver stage A) to ground; and (ii) DRV-B and DRV-C also are alternately actuated with respect to DRV-Y and DRV-Z.

The digital logic commutator means 60 uses solid state digital logic technology well known to those skilled in the art, a representative device that may be used for this function is the model CY384A made by The Cypress Company. Further, the switching means 80 also uses solid state technology well known to those skilled in the art; a suitable unit being model IR2130 made by The International Rectifier Company.

OPERATION

When a three-phase D.C. brushless motor is operating at any point of time two of the phases are being energized from the D.C. bus and one phase is off. One phase will be driven high, one phase will be driven low, and the third phase will be off. As is well known, a running motor back electromotive force or B.E.M.F. is always present and can be measured in the "off-phase" winding.

The FIG. 4 timing diagram shows (from top to bottom thereof) first, the voltages on leads 11, 12 and 13. Next, the select signal outputs from the commutator 60 are depicted, i.e., SEL-A, SEL-B and SEL-C. The off-phase voltage for each segment is next depicted, followed by the (50+X)% bus and (50−X)% bus signals. The next signals depicted are the (50+X)% pulses AA and CC produced at output 44 of comparator 40, followed by the (50−X)% pulse signals BB and DD produced by output 54 of comparator 40. The next (and remaining) signals depicted are DRV-A, DRV-B, DRV-C, DRV-X, DRV-Y and DRV-Z. FIG. 4 depicts a hypothetical or representative value of "X" equals 16%. Thus the D.C. voltage applied at input 43 of comparator 41 is (50+X)% bus voltage=66% bus voltage and input 53 of 51 has a D.C. applied voltage of (50−X)% bus voltage=34% bus; these D.C. voltage levels are depicted in FIG. 4. As mentioned, the basic concept of this invention is to have a 50% bus voltage compared with the BEMFs to generate control digital signals for the commutator 60; this concept is then augmented by a convenient means for phase advance, i.e., a selection of the value of "X" to harmonize with the desired performance of a specific D.C. motor.

In the first segment of timing diagram FIG. 4, i.e., between 30° and 90°, each segment being 60°, the following conditions can be observed. First, DRV-B and DRV-Y outputs are at zero voltage, or off, thus confirming that motor lead ØBY is the off-phase. The commutator 60 therefore "knows" that phase ØBY is "off". Therefore a signal is produced by 60 and is transmitted via lead 15 (SEL-B) to close switch 12' in the multiplexer. The B.E.M.F. voltage present on ØBY is shown in FIG. 4 to be a rising voltage. As indicated, SEL-B operates switch 12' to permit the ØBY rising voltage to be applied to output 22 of multiplexer 20 and thus to inputs 42 and 52 of comparators 41 and 51. Switches 11' and 13' are opened during this segment. DRV-Z and DRV-A are on. As the rising value of the ØBY voltage exceeds the value of the 66% bus voltage on input 43, then the comparator 41 produces a digital pulse AA (see FIG. 4) which is applied to the digital logic of commutator means 60 to commutate into the next segment, the D.C. pulse is depicted on the 66% bus voltage signal depicted in FIG. 4 and, as explained above, this functions to change the "Select" and "Drive" signals. Thus, for the second segment shown in FIG. 4, i.e., between 90° and 150°, it is noted that DRV-Z has been switched off, DRV-Y has been switched on, and DRV-A remains on; thus at this point motor winding ØCZ is the "open" phase; its B.E.M.F. voltage is a decreasing function as shown. The commutator 60 produces a signal on SEL-C lead 16 to close switch 13' of 20; switches 11' and 12' being open. As the voltage on lead 52 decreases below the 33% bus value, the comparator 51 functions to produce a pulse BB which again is applied to the digital logic of commutator 60 to cause the digital logic to commutate into the next segment and once again produce a new set of "Select" and "Driver" signals for the third segment. More specifically, the Select A lead 14 has a signal effective to close switch 11' so that the ØAX voltage (a rising voltage) is applied to output 22 and thence to the inputs 42 and 52 of comparators 41 and 51 respectively. No signals are on leads 15 and 16; hence switches 12' and 13' are open. Pulse BB has the further effect of driving DRV-A to zero and turning on DRV-C.

It will be understood that, in the third segment, the rising B.E.M.F. signal on ØAX will produce a 66% spike CC (see FIG. 4).

In the fourth segment, ØBY is once again the open or off phase, and FIG. 4 indicates that the B.E.M.F. voltage at this time is a decreasing voltage, thus when it falls below the (50−X)% bus level, a pulse DD (see FIG. 4) is produced at lead 54 as an input to the commutator means 60.

It will be understood that the motor continues to operate in the above-described manner. It will be noted from the timing diagram of FIG. 4 that after the first six 60° segments or a total of 360°, the timing diagram repeats itself.

The preferred embodiment of our invention shown in FIG. 3 has, as above described, comparators 41 and 51 with inputs 43 and 53 thereof set at preselected values of 66% bus voltage and 33% bus voltage respectively, a value of "X", or 16% being selected to provide the desired amount of phase advance for a hypothetical D.C. motor.

It should be understood, however, for a generic utilization of our invention, the D.C. input voltages for comparators 41 and 51 should each be 50% bus voltage; for this case the comparative function is motor speed independent.

The embodiment of FIG. 3 is speed dependent which is advantageous for some applications. Furthermore, in most cases a preselected value of "X", e.g. 16%, has been determined to provide optimum performance, regard being given to the well known advantages of phase advance.

The preceding detailed description of apparatus is for what some skilled in the art term a "hard chopping" mode, i.e., when a motor phase is disconnected from both the positive or plus D.C. bus and the negative or minus bus. For the "hard chopping" mode, the value of $V_1$ is 50% bus voltage and may be modified by ±"X" for phase advance, all as aforesaid.

The "soft chopping" mode is known by those skilled in the art to be descriptive of a motor control arrangement wherein, when a motor phase is to be disconnected, it is disconnected from only the positive D.C. bus; for this phase the value of $V_I$ is zero % of bus voltage ±"X".

The above-described apparatus thus provides a very easily implemented method of providing commutation for a D.C. brushless motor with a very high level of efficiency.

What is claimed is:

1. An apparatus for determining a commutation position of the rotor of a polyphase brushless D.C. motor having at least three field coils disposed about said rotor and adapted to be sequentially energized with driving signals to generate a rotating magnetic field for exerting torque on said rotor, said apparatus comprising:

a) off-phase coil selection means including:
  i) multiplexer means having individual connections to each of said field coils to thus receive respective B.E.M.F. voltages from said coils; and
  ii) controllable switching means for selectively connecting said coils to output means thereof;
b) B.E.M.F. and D.C. voltage level comparator means having first and second comparators each having:
  i) a first input connected to said output means of said multiplexer means;
  ii) a second input adapted respectively to be connected to preselected D.C. voltages; and
  iii) means for producing output digital signals upon said B.E.M.F. signals being respectively equal to said D.C. voltages;
c) commutator means connected to receive said digital signals of said first and second comparators and further comprising digital logic means for selectively producing:
  i) a plurality of select signals, and
  ii) a plurality of motor coil drive signals;
d) a plurality of motor field coil driver stages switching means, each individually connected respectively to said field coils and each selectively being connected to a preselected D.C. voltage bus;
e) means for selectively connecting said plurality of select signals to selectively control said switching means of said multiplexer means, and
f) means for selectively connecting said plurality of motor coil drive signals respectively to control said plurality of driver stages to selectively connect said D.C. voltage bus to said field coils,
whereby said switching means of said off-phase selection means is controlled by said plurality of select signals so that the motor field coil off-phase B.E.M.F. is connected to said first inputs of said comparators to thereby produce a digital output from one of said comparators to thereby enable said commutator means to selectively produce another select signal and another motor coil drive signal.

2. Apparatus of claim 1 further characterized by said second inputs of said first and second comparators being respectively connected to:
  a) a D.C. voltage equal to (50+X)% of said D.C. voltage bus and
  b) to a D.C. voltage equal to (50−X)% of said D.C. voltage bus, where X is selected to produce a desired phase advance of said motor.

3. Apparatus of claim 1 further characterized by said second inputs of said first and second comparators being connected to a D.C. voltage equal to 50% of said D.C. voltage bus.

4. An apparatus for determining a commutation position of the rotor of a polyphase brushless D.C. motor having at least three field coils disposed about said rotor and adapted to be sequentially energized with driving signals to generate a rotating magnetic field for exerting torque on said rotor, said apparatus comprising:
  a) off-phase coil selection means including:
    i) means having individual connections to each of said field coils to thus receive respective B.E.M.F. voltage signals from said coils; and
    ii) controllable switching means for selectively connecting said B.E.M.F. voltage signals to output means thereof;
  b) first and second B.E.M.F. and D.C. voltage level comparator means, each having:
    i) a first input connected to said output means of said controllable switching means;
    ii) a second input connected to a preselected D.C. voltages; and
    iii) means for producing an output digital signal upon said B.E.M.F. signals being respectively equal to said D.C. voltage;
  c) commutator means connected to receive said digital output signals of said first and second comparators and further comprising digital logic means for selectively producing:
    i) a plurality of select signals, and
    ii) a plurality of motor coil drive signals;
  d) a plurality of motor field coil driver stages switching means, each individually connected respectively to said field coils and each selectively being connected to a preselected D.C. voltage bus;
  e) means for selectively connecting said plurality of select signals to selectively control said controllable switching means of said off-phase coil selection means, and
  f) means for selectively connecting said plurality of motor coil drive signals respectively to control said plurality of driver stages to selectively connect said D.C. voltage bus to said field coils,
  whereby said switching means of said off-phase selection means is controlled by said plurality of select signals so that the motor field coil off-phase B.E.M.F. is connected to said first inputs of said comparators to thereby produce a digital output from one of said comparators to thereby enable said commutator means to selectively produce another select signal and another motor coil drive signal.

5. Apparatus of claim 4 further characterized by said second inputs of said first and second comparators being respectively connected to:
  a) a D.C. voltage equal to (50+X)% of said D.C. voltage bus; and
  b) a D.C. voltage equal to (50−X)% of said D.C. voltage bus, where X is selected to produce a desired phase advance of said motor.

6. Apparatus of claim 4 further characterized by said second inputs of said first and second comparators being connected to a D.C. voltage equal to 50% of said D.C. voltage bus.

7. An apparatus for determining a commutation position of the rotor of a polyphase brushless D.C. motor having at least three field coils disposed about said rotor and adapted to be sequentially energized with driving signals to generate a rotating magnetic field for exerting torque on said rotor, said apparatus comprising:
  a) off-phase coil selection means including:
    i) multiplexer means having individual connections to each of said field coils to thus receive respective B.E.M.F. voltages from said coils; and
    ii) controllable switching means for selectively connecting said B.E.M.F. voltage signals to output means thereof;
  b) B.E.M.F. and D.C. voltage level comparator means having:
    i) a first input connected to receive said selected B.E.M.F. voltage signals;
    ii) a second input connected to a preselected D.C. voltage; and
    iii) means for producing an output digital signals upon said B.E.M.F. signals being respectively equal to said D.C. voltages;

c) commutator means connected to receive said digital signals of said comparator means and further comprising digital logic means for selectively producing:
  i) a plurality of select signals, and
  ii) a plurality of motor coil drive signals;
d) a plurality of motor field coil driver stages switching means, each individually connected respectively to said field coils and each selectively being connected to a preselected D.C. voltage bus;
e) means for selectively connecting said plurality of select signals to selectively control said controllable switching means of said multiplexer means, and
f) means for selectively connecting said plurality of motor coil drive signals respectively to control said plurality of driver stages to selectively connect said D.C. voltage bus to said field coils, whereby said controllable switching means of said off-phase selection means is controlled by said plurality of select signals so that the motor field coil off-phase B.E.M.F. is connected to said first input of said comparator means to thereby produce a digital output to thereby enable said commutator means to selectively produce another select signal and another motor coil drive signal.

8. Apparatus of claim 7 further characterized by said second input of said comparator means being connected to a D.C. voltage approximately equal to 50% of said D.C. voltage bus.

* * * * *